No. 762,026.

Patented June 7, 1904.

UNITED STATES PATENT OFFICE.

WILHELM CONNSTEIN, OF CHARLOTTENBURG, GERMANY, ASSIGNOR TO VEREINIGTE CHEMISCHE WERKE ACTIEN-GESELLSCHAFT, OF CHARLOTTENBURG, GERMANY, A FIRM.

PROCESS OF MAKING FATTY ACIDS.

SPECIFICATION forming part of Letters Patent No. 762,026, dated June 7, 1904.

Application filed October 24, 1902. Serial No. 128,657. (No specimens.)

*To all whom it may concern:*

Be it known that I, WILHELM CONNSTEIN, doctor of medicine, a subject of the King of Prussia, German Emperor, residing at 16 Salzufer, Charlottenburg, Kingdom of Prussia, German Empire, have invented new and useful Improvements in Processes for the Manufacture of the Fatty Acids from Their Esters, of which the following is a specification.

This invention relates to the process of manufacturing fatty acids from their esters and materials containing the said esters by means of ferments, and has for its object to render the process more expeditious and considerably cheaper.

The presence of fat-decomposing ferments in oil-bearing seeds of plants has been observed by Green (*Proceedings of the Royal Society* September 20, 1890, Green-Windisch *Die Enzyme*, Berlin, 1901, page 230) and by Sigmund (*Monatshefte für Chemie*, 1890, page 268, and *Reports of Meetings of the Vienne Academy of Sciences* for July 1, 1891) in the course of their inquiries instituted with the view of ascertaining certain questions relating to the physiology of plants. These authors have established it as a fact that during the process of trituration of oleaginous seeds with water there gradually forms acid, and they explained this circumstance by the existence in the seeds of a ferment which had the property of decomposing the fats also contained in the seed into free fatty acid—for instance, palmitic, stearic, oleic acid—and glycerin. They state, however, that the ferment becomes inoperative owing to the presence of small quantities of alkali or acid. They also point out that if the operations be conducted under the conditions and within the limits which they have laid down the decomposition will progress up to a certain stage only, and this amounts to saying that when their conditions are adhered to the decomposition of the fatty-acid esters is not possible by this process for industrial or trade purposes—that is, on a somewhat large scale.

Now I have found that the decomposition of the fats can be rendered possible and available for purposes of manufacture on a large scale by means of the ferments contained in many plants and in particular in the *Euphorbiaceæ*, more especially the *Ricinus* (castor-oil) varieties of that order of plants, by diverging from the methods communicated by Green and Sigmund in this, that instead of causing the ferments to exercise their action in a neutral solution this action is induced in an acid solution, by which modified mode of procedure not only are the esters decomposed nearly quantitatively, but improved results are, moreover, attained in the following direction.

In an acid solution it is principally the more important higher fatty-acid esters which are attacked, whereas if the conditions stated by Green and Sigmund be maintained all that becomes decomposed are the esters of the lower fatty acids containing a smaller number of atoms of carbon which are of less technical importance.

The utilization of the observations above mentioned in the decomposition of fatty-acid esters for industrial purposes may take place by causing the ferments of the plants to act upon the fats to be decomposed in presence of a certain amount of acid, such as sulfuric acid, added at the beginning of the operation.

The conditions which should be complied with in order to insure the best possible results are the following: First, the maintenance of not too high a temperature—say between 10° and 40° centigrade—and, second, the presence of small amounts of acids in a diluted state. This method of operation has proved particularly effective in the case of sulfuric acid concentrated to a density of one-tenth normal standard and of hydrochloric acid, although it is applicable also to organic acids. The organic acid might be either added to the fat under treatment artificially at the beginning of the operation or may be allowed to develop of its own accord in the course of the process of decomposition. When the fat is prepared for treatment without an immediate addition of acid, there gradually takes place a slight "splitting" of the low-graded fatty-acid esters; but it will not be until after several days that a quantity of acid will become free sufficient to initiate an energetic decomposition of the fatty-acid esters of a higher order.

An example may serve to explain the facts described. Upon triturating five grams of shelled ricinus-seed with cold water acid equal to 1.2 cubic centimeters of a one-tenth normal solution of soda-lye will be found to have formed after an interval not exceeding about half an hour. After two days' standing the proportion of acid will be found to have doubled (2.5 cubic centimeters one-tenth normal NaOH) and eventually, by the time that four days have elapsed, the acid which has been slowly increasing in quantity will have reached a sufficiently high degree of concentration to initiate a powerful and energetic decomposition of the fatty-acid esters of higher order—$i.\,e.$, containing a relatively high number of carbon atoms—with the result that now, on the fourth day, the proportion of acid has suddenly rushed up to fifty-nine cubic centimeters one-tenth normal NaOH. Instead of in four days this result might have been obtained within a few hours had a certain amount of one-tenth normal sulfuric acid been added to the ricinus-seed and water emulsion from the first.

Green and Sigmund in their experiments had arrived at the unsatisfactory results which they report because they were under the mistaken impression that acid would impair the ferment and because they would discontinue operations at a period at which no energetic action could possibly have set in from lack of acid.

Further conditions to be observed are—

Third. The presence of an amount of water at least equal to the theoretical quantity found by the following general equation:

$$RCOOR_1 + H_2O = RCOOH + R_1OH.$$

For instance:

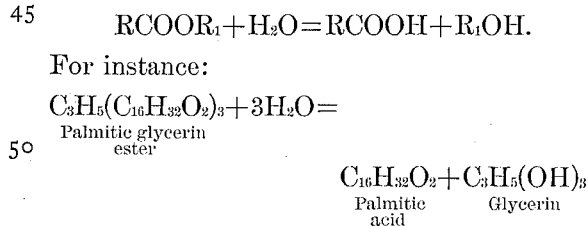

$$C_3H_5(C_{16}H_{32}O_2)_3 + 3H_2O =$$
Palmitic glycerin ester $$C_{16}H_{32}O_2 + C_3H_5(OH)_3$$
Palmitic acid  Glycerin Fourth. What is of especial importance in carrying out this process is that the fats should be present in a state of emulsion. The emulsion may be prepared in any known manner for producing from fats, oils, &c.—for example, by triturating—the fat to be decomposed together with the constituent parts of the plants and with water.

If the above conditions be complied with, an adequate result may be fully relied on. Thus by treating together six kilograms of ricinus-seed, one hundred kilograms of tallow, palm-oil, blubber, (train-oil,) or other fats, twenty kilograms of water, and one hundred grams of concentrated sulfuric acid, mixing the whole until an emulsion is produced and allowing the emulsion to stand at rest, there will be obtained as a result an approximately quantitative splitting up or decomposition of the neutral fat. The products of such decomposition (the fatty acids of the respective fats or oils and glycerin) separated by the usual methods—such as pressing, filtering, &c.—are of so high a degree of purity that an equivalent could otherwise be obtained only by resorting to uncommonly expensive processes of purification.

An instance of the employment of the process for the manufacture of fatty acids from fats of animal origin and as showing its practicability for use with all fats and oils, whether they be fatty-acid esters of glycerin or others, may be given as follows: Fifteen kilograms of spermaceti (Walrat) are triturated with 4.5 kilograms of ricinus-seed and ten kilograms $\frac{n}{10}$ of acetic acid and maintained for a period of eighteen hours at a temperature of 35°. After this period thirty-two per cent. of the spermaceti will be split off into the fatty acid.

Now it has been found that the addition of acids is not absolutely necessary in carrying out this process, but may be replaced generally by treatment calculated to bring about an acid reaction. The essential condition whereon the success of the process depends is that the ferments should operate in a medium capable of acid reaction, while it is not an indispensable condition that such acid reaction should be induced by the presence of free acids.

In accordance with this process the novel observation is taken advantage of by causing the ferments to act upon the emulsion of the fats in presence of acid salts—$e.\,g.$, sodium bisulfate, acid sodium phosphate, or the like. In other respects the performance of the process is the same as if acid were employed in accordance with the foregoing description.

The acid salts may be superadded in solutions; but an addition may take place also in a solid form, so that the solution shall be produced only gradually. The degree of concentration is preferably one-tenth normal.

What I claim as my invention, and desire to secure by Letters Patent, is—

1. The process of decomposing fatty-acid esters into their acids and alcohols, which consists in providing a medium of acid reaction, emulsifying said esters to be treated and subjecting said emulsion in the presence of the said medium of acid reaction to the action of the fat-decomposing ferments present in oil or fat bearing plants.

2. The process of decomposing fatty-acid esters into their acids and alcohols, which consists in providing a medium containing free acid, emulsifying the esters to be treated and subjecting said emulsion in the presence of said free acid to the action of the fat-decomposing ferments present in ricinus-seed.

In witness whereof I have hereunto signed my name, this 8th day of October, 1902, in the presence of two subscribing witnesses.

WILHELM CONNSTEIN.

Witnesses:
WOLDEMAR HAUPT,
HENRY HASPER.